United States Patent [19]
Gilles

[11] 3,909,491
[45] Sept. 30, 1975

[54] HYDROXYPHENYLALKYLENEYL ISOCYANURATE/THIOPHOSPHITE COMBINATIONS AS STABILIZERS FOR ORGANIC MATERIALS

[75] Inventor: Jack C. Gilles, Shaker Heights, Ohio

[73] Assignee: The B. F. Goodrich Company, Akron, Ohio

[22] Filed: Oct. 15, 1973

[21] Appl. No.: 406,344

[52] U.S. Cl. ...... 260/45.8 NT; 252/400 A; 252/404; 260/45.7 PS; 260/45.8 R; 260/398.5
[51] Int. Cl.² .................... C08K 5/34; C08K 5/49
[58] Field of Search. 260/45.7 PS, 45.8 NT, 45.8 R; 252/400 A

[56] References Cited
UNITED STATES PATENTS

| | | | |
|---|---|---|---|
| 3,359,234 | 12/1967 | Milionis et al. | 260/45.75 |
| 3,496,128 | 2/1970 | Casey et al. | 260/23 |
| 3,637,582 | 1/1972 | Gilles | 260/45.8 |
| 3,666,837 | 5/1972 | Rattenbury | 260/928 |

*Primary Examiner*—Donald E. Czaja
*Assistant Examiner*—R. A. White
*Attorney, Agent, or Firm*—Alan A. Csontos

[57] ABSTRACT

Organic materials subject to thermal and/or oxidative degradation are efficiently stabilized using a combination of a hydroxyphenylalkyleneyl isocyanurate compound and a thiophosphite compound. The stabilized compositions exhibit exceptional stability, better than that achieved using either compound alone or using any known combination of phenolic and phosphorous-containing stabilizer compounds.

10 Claims, No Drawings

HYDROXYPHENYLALKYLENEYL ISOCYANURATE/THIOPHOSPHITE COMBINATIONS AS STABILIZERS FOR ORGANIC MATERIALS

BACKGROUND OF THE INVENTION

Phenolic compounds, particularly hydroxyphenyl substituted heterocyclic compounds, are known to be stabilizers for organic materials. Phosphorus-containing compounds, particularly phosphates and phosphites, are also known to be stabilizers for organic materials. Specific combinations of phenolic compounds and phosphorous-containing compounds are also disclosed in the art. Relevant art in this area is: U.S. Pat. Nos. 3,112,272; 3,115,466; 3,145,176; 3,294,736; 3,333,027; 3,531,483; 3,567,724; 3,652,561; 3,666,837, and 3,678,047.

SUMMARY OF THE INVENTION

Combinations of (1) a hydroxyphenylalkyleneyl isocyanurate of the formula

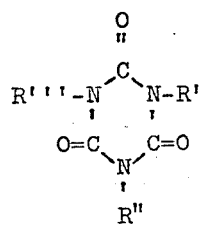

wherein R' is a hydroxyphenylalkyleneyl radical of the formula

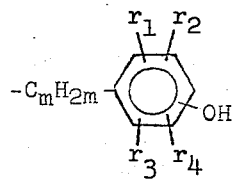

where $m$ is 1 to 4, $r_1$ is an alkyl radical having 1 to 18 carbon atoms and is positioned immediately adjacent to the hydroxyl group on the ring; $r_2$, $r_3$ and $r_4$ are hydrogen or an alkyl radical containing 1 to 18 carbon atoms; and R'' and R''' are hydrogen, an alkyl radical containing 1 to 18 carbon atoms, or are the same as R'; and (2) a thiophosphite compound selected from the group consisting of (a) an alkylthiophosphite of the formula:

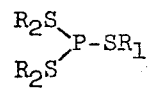

wherein $R_1$ is an alkyl radical containing about 8 to about 20 carbon atoms and $R_2$ is the same as $R_1$, or both $R_2$ radicals form with the thiophosphorousthio structure a cyclic ring of 5 to about 8 atoms, and (b) a polyalkylthiopolyphosphite of the formula

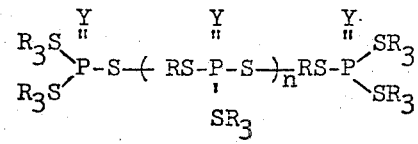

wherein $n$ is 0 to 9; R is an alkylene radical of 1 to about 20 carbon atoms, an alkyloxyalkyl or alkylthioalkyl radical containing 2 to about 20 carbon atoms, a cycloalkylene radical of 5 to 6 carbon atoms in the ring, or an arylene radical of 6 to 10 carbon atoms; $R_3$ is an alkyl radical of 1 to about 20 carbon atoms; and Y is nothing or oxygen, are useful as stabilizers for organic materials. Stabilized compositions containing the combination exhibit exceptional thermal and/or oxidative stability.

DETAILED DESCRIPTION OF THE INVENTION

The combination of a hydroxyphenylalkyleneyl isocyanurate compound and a thiophosphite compound is an exceptionally good thermal and/or oxidative stabilizer for organic materials. The hydroxyphenylalkyleneyl isocyanurate compound is used at a level from about 0.01 part to about 5 parts by weight, and more preferredly at from about 0.05 part to about 3 parts by weight per 100 parts by weight of the organic material. The thiophosphite compound is employed at similar levels, i.e., from about 0.01 part to 5 parts and preferably at about 0.05 part to about 3 parts by weight per 100 parts by weight of organic material. Thus, the combined weight of the compounds is from about 0.02 part to about 10 parts and more preferredly from about 0.1 to 6 parts by weight per 100 parts by weight of organic material. The hydroxyphenylalkyleneyl isocyanurate can be used in from about a 10:1 to 1:10 weight ratio of isocyanurate compound to thiophosphite compound. Excellent results are obtained at about a 3:1 to 1:3 weight ratio. A 1:1 weight ratio of the compounds provides very effective stabilization of organic materials.

The hydroxyphenylalkyleneyl isocyanurate compounds have the formula

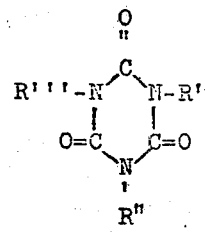

wherein R' is a hydroxyphenylalkyleneyl radical of the formula

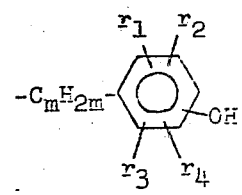

where $m$ is 1 to 4, $r_1$ is an alkyl radical having 1 to 18 carbon atoms and is positioned immediately adjacent to the hydroxy group on the ring; $r_2$, $r_3$ and $r_4$ are hydrogen or an alkyl radical containing 1 to 18 carbon atoms, and R″ and R‴ are hydrogen, an alkyl radical containing 1 to 18 carbon atoms, or are the same as R′. A more preferred compound is when R″ and R‴ are equal to R′, i.e., all the R groups are hydroxyphenylalkyleneyl radicals, and $r_1$ is a t-alkyl radical containing from 4 to about 12 carbon atoms, $r_2$ is an alkyl radical containing 1 to 12 carbon atoms, $r_3$ and $r_4$ are hydrogen, and $m = 1$.

Even more preferred are the symmetrical tris(3,5-di-tert-alkyl-4-hydroxybenzyl)isocyanurates of the formula

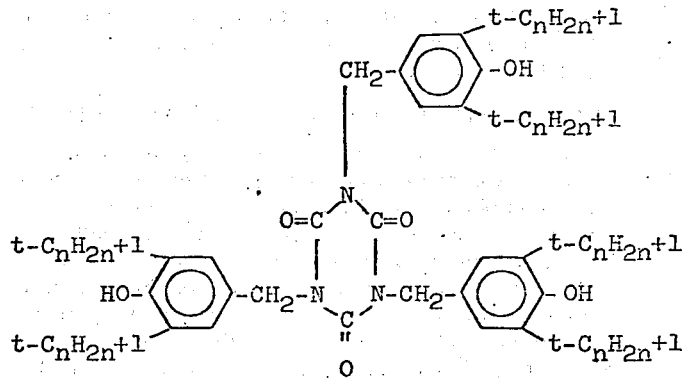

where $n$ is 4 to 8.

Examples of the 4-hydroxybenzyl isocyanurate compounds are: tris-(3-methyl-4-hydroxybenzyl)isocyanurate, tris-(3-t-butyl-4-hydroxybenzyl)isocyanurate, tris-(3-t-amyl-4-hydroxybenzyl)isocyanurate, tris-(3-cetyl-4-hydroxybenzyl)isocyanurate, tris-(3,5-dimethyl-4-hydroxybenzyl)isocyanurate, tris-(3,5-diisopropyl-4-hydroxybenzyl)isocyanurate, tris-(3-methyl-5-isopropyl-4-hydroxybenzyl)isocyanurate, tris-(3-cyclohexyl-4-hydroxybenzyl(isocyanurate, tris-(3,5-di-t-butyl-4-hydroxybenzyl)isocyanurate, tris-(3-t-butyl-5-t-amyl-4-hydroxybenzyl)isocyanurate, tris-(3,5-di-t-amyl-4-hydroxybenzyl)isocyanurate, tris-[3,5-di-(1-methyl-1-ethylpropyl)4-hydroxybenzyl]isocyanurate, tris-[3,5-di-(1,1,2,2-tetramethylpropyl)-4-hydroxybenzyl]isocyanurate, tris-[3,5-di-(1-dimethylpentyl)-4-hydroxybenzyl]isocyanurate, bis-(3-methyl-4-hydroxybenzyl)-isocyanurate, bis-(3-t-butyl-4-hydroxybenzyl)isocyanurate, bis(3,5-dimethyl-4-hydroxybenzyl)isocyanurate, bis-(3,5-di-t-butyl-4-hydroxybenzyl)isocyanurate, (3-methyl-4-hydroxybenzyl)isocyanurate, (3-t-butyl-4-hydroxybenzyl)isocyanurate, (3,5-dimethyl-4-hydroxybenzyl)isocyanurate, (3,5-di-t-butyl-4-hydroxybenzyl)isocyanurate, and the like. Reference is made to U.S. Pat. No. 3,531,483 which discloses isocyanurate compounds encompassed by this invention. The patent shows the preparation of these compounds and their utility as stabilizers, and is hereby incorporated by reference.

The thiophosphite compound is selected from the group consisting of alkylthiophosphites and polyalkylthiopolyphosphites. The alkylthiophosphites have the formula

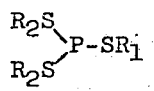

wherein $R_1$ is an alkyl radical containing about 8 to about 20 carbon atoms and $R_2$ is the same as $R_1$, or both $R_2$ radicals form with the thiophosphorousthio structure a cyclic ring of 5 to about 8 atoms.

Examples of the alkylthiophosphite are tris(octylthio) phosphite, tris(2-ethylhexylthio)phosphite, tris(decylthio)phosphite, tris(dodecylthio)phosphite, tris(tetradecylthio)phosphite, tris(octadecylthio)phosphite, mono(dodecylthio)bis(octadecylthio)phosphite, mono(octylthio)ethylenedithio phosphite, and the like. More preferredly, $R_1$ and $R_2$ are alkyl radicals as defined above.

The polyalkylthiopolyphosphite compounds have the formula

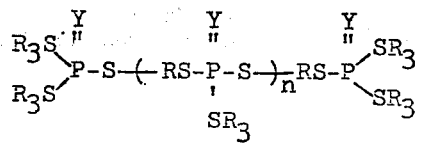

wherein $n = 0$ to 9; R is an alkylene radical of 1 to about 20 carbon atoms, an alkyloxyalkyl or alkylthioalkyl radical containing 2 to about 20 carbon atoms, a cycloalkylene radical of 5 to 6 carbon atoms in the ring, or an arylene radical of 6 to 10 carbon atoms; $R_3$ is an alkyl radical of 1 to about 20 carbon atoms in the radical, and Y is nothing or oxygen. More preferredly, $n = 0$ and R is either an alkylene radical of 1 to about 10 carbon atoms or an alkyloxyalkyl radical containing 2 to about 10 carbon atoms, and Y is nothing.

Examples of the polyalkylthiopolyphosphite compounds are: tetrakis(ethylthio)1,2-dithioethylene diphosphite, tetrakis(hexylthio)1,2-dithioethylene diphosphite, tetrakis(dodecylthio)1,2-dithioethylene diphosphite, tetrakis(butylthio)1,2-dithiopropylene diphosphite, tetrakis(isopropylthio)1,3-dithiopropylene diphosphite, tetrakis(methylthio)1,6-dithiohexylene diphosphite, di(ethylthio)di(propylthio)1,6-dithiohexylene diphosphite, tetrakis(t-butylthio)1,6-dithiohexylene diphosphite, tetrakis(sec-butylthio)1,6-dithiohexylene diphosphite, tetrakis(2-ethylhexylthio)1,6-dithiohexylene diphosphite, tetrakis(dodecylthio)1,6-dithiohexylene diphosphite, tetrakis(hexadecylthio)1,6-dithiohexylene diphosphite, tetrakis(octadecylthio)1,6-dithiohexylene diphosphite, tetakis(eicosanylthio)1,6-dithiohexylene diphosphite, tetrakis(decylthio)1,20-dithioeicosanylene diphosphite, tetrakis(dodecylthio)β,β′-dithioethylether diphosphite, tetrakis(- dodecylthio)omega, omega dithiooctylether diphosphite, tetrakis(dodecylthio)p-dithiophenylene diphosphite, tetrakis(dodecylthio)2-methyl-1,4-dithiophenylene diphosphite, tetrakis(cetylthio)dithiocyclohexylene diphosphite, tetrakis(dodecylthio)1,4-bis(thiomethyl)-benzene diphosphite, tetrakis(dodecylthio)1,4-bis(thiomethyl)cyclohexane diphosphite, tetrakis(dodecylthio)1,3dithiocyclopentylene diphosphite, tetrakis-(dodecylthio)1,8-dithionaphthalene diphosphite, pentakis(dodecylthio)bis(1,6-hexylenedithio)triphosphite, pentakis(octadecylthio)bis(1,2-ethylenedithio)triphosphite, pentakis(isodecylthio)bis($\beta,\beta'$-dithioethylether)triphosphite, hexakis(dodecylthio)tris(1,6-hexylenedithio)tetraphosphite, heptakis(dodecylthio)-tetrakis(1,6-hexylenedithio)pentaphosphite, and dodecakis(dodecylthio)nonakis(1,6-hexylenedithio)decaphosphite. Reference is made to U.S. Pat. No. 3,666,837 which discloses thiophosphite compounds encompassed by this invention. The patent shows the preparation of these compounds and their utility as stabilizers, and is hereby incorporated by reference.

The combination of the isocyanurate compound and the thiophosphite compound as defined herein provides exceptional thermal and/or oxidative stability to organic materials. Stabilized composition containing the combination exhibit better stability then compositions containing either compound alone, or compositions containing known combinations of a phenolic stabilizer and a phosphorous-containing stabilizer.

Organic materials which are stabilized in accordance with the presence invention include both natural and synthetic polymers. The combination is useful for the stabilization of cellulosic materials; natural rubber; halogenated rubber; homopolymers of ethylene, propylene, butene-1, isobutylene, pentene-1, hexene-1, 4-methyl-1-pentene, and the like, or copolymers thereof such as ethylene-propylene copolymer, ethylene-butene-1 copolymer, 4-methyl-1-pentene-hexene-1 copolymer, and the like; ethylene-propylene-diene rubbers wherein the diene is 1,4-hexadiene, 2-methyl-1,4-hexadiene, a dimethyl-1,4,9-decatriene, dicyclopentadiene,vinyl cyclohexene, vinyl norbornene, ethylidene norbornene, methylene norborene, norbornadiene, methyl norbornadiene, methyl tetrahydroindene, and the like; conjugated diene polymers, as, for instance, polybutadiene, copolymers of butadiene with styrene, acrylonitrile, acrylic acid, alkyl acrylates or methacrylates, methyl vinyl ketone, vinyl pyridine, etc., polyisoprene, polychloroprene, and the like; vinyl polymers such as polyvinyl chloride, polyvinyl fluoride, polyvinylidene chloride, copolymers of vinyl chloride with vinylidene chloride, polyvinyl acetate, copolymers of vinyl halide with butadiene, styrene, vinyl esters, $\alpha,\beta$-unsaturated acids and esters thereof, $\alpha,\beta$-unsaturated ketones and aldehydes, and the like; homopolymers and copolymers of acrylic monomers such as acrylic acid, methylacrylic acid, methyl acrylate, methyl methacrylate, ethyl acrylate, 3-ethylhexyl acrylate, acrylamide, methacrylamide, N-methylolacrylamide, acrylonitrile, methacrylonitrile, and the like; polyether- or polyol-derived polyurethanes; acetal homopolymers and copolymers; polycarbonates; polyesters such as those derived from maleic, fumaric, itaconic, or terephthalic anhydrides, or the like; for example, polyethylene terephthalate; polyamides such as those derived from the reaction of hexamethylenediamine with adipic or sebacic acid; epoxy resins such as those obtained from the condensation of epichlorohydrin with bisphenols; and the like. Polymer blends, that is, physical admixture of two or more polymers may also be stabilized in accordance with the present invention.

In addition to polymeric materials, the present compounds act to stabilize a wide variety of other organic materials. Such compounds include: waxes, synthetic and petroleum-derived lubricating oils and greases; animal oils such as, for example, fat, tallow, lard, cod-liver coil, sperm oil; vegetable oils such as castor, linseed, peanut, palm, cotton seed, and the like; fuel oil; diesel oil, gasoline, and the like.

The novel combination of this invention is especially useful for the stabilization of $\alpha$-monoolefin homopolymers and copolymers, wherein the $\alpha$-monoolefin contains 2 to about 8 carbon atoms. High- and low-density polyethylene, polypropylene, polyisobutylene, poly(4-methyl-1-pentene) have excellent resistance to oxidative attack when stabilized with the combinations of the present invention. Ethylene-propylene copolymers and ethylene-propylene terpolymers generally containing less than about 10% by weight of one or more monomers containing multiple unsaturation also are stabilized using the combination.

The compounds are readily incorporated into the organic materials by dissolving or dispersing them within the materials. If the material is a solid, especially a polymeric solid such as a rubber or a plastic, the compounds can be admixed using Banburys, extruders, two-roll mills, and the like, following conventional techniques. A good way to disperse the compounds in plastic materials is to dissolve or suspend the compounds in a solvent such as acetone or benzene, mix the mixture with the plastic in powder form, and then evaporate off the solvent.

Compositions containing the novel combination of compounds can also contain many other known compounding ingredients such as fillers like carbon black, silica, metal carbonates, talc, asbestos, and the like; pigments and colorants; curative ingredients like sulfur and peroxides and vulcanization accelerators; fungicides and many more standard ingredients known to the art.

The novel combination of a hydroxyphenylalkyleneyl isocyanurate compound and a phosphite compound was evaluated as a stabilizer for a polymeric $\alpha$-monoolefin homopolymer. Testing consisted of both thermal and oxidative stability of prepared samples. In addition to the novel combinations of this invention, other phenolic compound/phosphorous-containing compound stabilizer comcbinations were evaluated. All samples were prepared by dissolving the stabilizer compounds in benzene, swelling the polypropylene polymer in benzene, admixing the two mixes, and evaporating off the benzene. The stabilized composition is then extruded at 220°C, at 50 rpm and test samples molded from the extrudate at 220°C. to form strips 1 inch by 2 inches by 30 mils thick. These strip samples are employed in the oven aging and oxygen absorption tests.

The thermal stability (oven aging) testing consisted of aging of samples in an air-circulation oven at 140°C. until visual cracking of the sample was observed. At the first signs of crack development, the strip is bent slightly to see if it breaks (embrittlement). The time to the onset of cracking or embrittlement is measured. Samples are run in duplicate and the data averaged.

The oxidative stability (oxygen absorption) test consisting of aging the samples at 150°C. in an atmopshere of pure oxygen and recording the oxygen uptake of the samples. The test used in a standard oxygen absorption test where the samples are hung in pure oxygen and the volume of oxygen in the chamber measured. At a decrease of 0.1 cc of oxygen in the chamber (taken up by the sample), 0.1 cc of oxygen is added to the chamber and its addition recorded. The measurement is then oxygen demand (uptake) in the chamber versus time. This data is plotted and time to failure is determined by the onset of rapid oxygen uptake by the sample. Test samples are run in duplicate and the data averaged.

The following examples serve to more fully illustrate the combinations and compositions of this invention. The recipes are given in parts by weight unless otherwise specified.

EXAMPLE I

Compositions were prepared containing polypropylene and a hydroxyphenylalkyleneyl isocyanurate and-/or a polyalkylthiopolyphosphite compound as defined in this invention. The sample compositions were tested for their thermal and oxidative stability. Recipes and data obtained are as follows:

|  | 1 | 2 | 3 | 4 | 5 | 6 |
|---|---|---|---|---|---|---|
| Polypropylene[a] | 100 | 100 | 100 | 100 | 100 | 100 |
| Isocyanurate compound[b] | — | 0.25 | 0.50 | — | — | 0.25 |
| Thiophosphite compound[c] | — | — | — | 0.25 | 0.50 | 0.25 |
| 140°C. oven test, hours | less than 24 hrs. | 250 | 710 | 168 | 360 | 8536 |
| 150°C. oxygen absorption test, hours | less than 1 hr. | 8 | 12.5 | 2 | 22 | 414 |

[a]General purpose resin (Profax 6501)
[b]1,3,5-tris(3,5-di-t-butyl-4-hydroxybenzyl)isocyanurate
[c]tetrakis(dodecylthio)-1,6-dithiohexylene diphosphite The data shows that sample 6, using a combination of this invention, provides far superior stability to polypropylene than the use of either compound alone.

EXAMPLE II

A series of samples were prepared at various weight ratios of hydroxyphenylalkyleneyl isocyanurate compound to polyalkylthiopolyphosphite compound. The recipes and evaluation data obtained are given in the following table.

The data shows that excellent stability is provided over a broad weight ratio and broad levels of the defined compounds. At higher levels of use, samples 6, 7 and 8, exceptionally good thermal and oxidative stability is obtained.

EXAMPLE III

Sample compositions were prepared using different phenolic stabilizers in combination with the polyalkylthiopolyphosphite compound employed in Example II. The samples were prepared using 0.1 part by weight each of the phenolic stabilizer and the tetrakis(dodecylthio)-1,6-dithiohexylene diphosphite per 100 parts by weight of propylene (a 1:1 weight ratio of phenolic to thiophosphite). Tests were run to determine thermal stability of the compositions.

| Phenolic Compound | 140°C. Oven Aging Hours |
|---|---|
| Tetrakis(methylene-3-(3',5'-di-t-butyl-4-hydroxyphenyl)propionate)methane | 2580 |
| Bis(3,5-di-t-butyl-4-hydroxybenzyl)-dodecyl malonate | 2376 |
| 2,2',2''-tris(3-(3,5-di-t-butyl-4-hydroxyphenyl)propionyloxy)ethylisocyanurate | 2376 |
| 2,4,6-tris(3,5-di-t-butyl-4-hydroxybenzylthio)triazine | 1716 |
| 1,3,5(3,5-di-t-butyl-4-hydroxybenzyl)isocyanurate | 3480 |

The data shows the superior results obtained when employing the hydroxyphenylalkyleneyl isocyanurate compound of this invention (sample 5 versus samples 1 to 4).

EXAMPLE IV

The hydroxyphenylalkyleneyl isocyanurate compound employed in Example II was used in combination with different phosphorous-containing stabilizers to prepare sample compositions. The 1,3,5-tris(3,5-di-t-butyl-4-hydroxybenzyl)isocyanurate and phosphorous-containing compounds were used at a 1:1 weight ratio, both compounds used at 0.25 part by weight per 100 parts by weight of propylene. The recipes used and data obtained follow.

|  | 1 | 2 | 3 | 4 | 5 | 6 | 7 | 8 |
|---|---|---|---|---|---|---|---|---|
| Polypropylene | 100 | 100 | 100 | 100 | 100 | 100 | 100 | 100 |
| 1,3,5-tris(3,5-di-t-butyl-4-hydroxybenzyl)isocyanurate | 0.1 | 0.1 | 0.15 | 0.25 | 0.25 | 0.25 | 0.25 | 0.10 |
| Tetrakis(thiododecyl)-1,6-dithiohexylene diphosphite | 0.05 | 0.1 | 0.1 | 0.05 | 0.1 | 0.25 | 0.50 | 1.0 |
| Weight ratio | 2:1 | 1:1 | 1.5:1 | 5:1 | 2.5:1 | 1:1 | 1:2 | 1:10 |
| 140°C. oven aging, hours | 744 | 3480 | 3816 | 3444 | 6000 | 8536 | 8832 | 6264 |
| 150°C. oxygen absorption, hours | 7.2 | 12.5 | 14.0 | 30.4 | 82 | 414 | 865 | 326 |

| Sample | Phosphorous-Containing Compound | 140°C. Oven Aging Hours | 150°C. Oxygen Absorption |
|---|---|---|---|
| 1 | Tris(nonylphenyl)phosphite | 3072 | 30 |
| 2 | Triphenyl phosphite | 3780 | 19 |
| 3 | Tris(p-methoxyphenyl)phosphite | 4824 | 18 |
| 4 | Tris(p-phenyl phenyl)phosphite | 2412 | 10 |
| 5 | $(C_9H_{19}\text{—}\bigcirc\text{—}O\text{—})_2P\text{—}(OCH_2CHO\text{—}P\text{—})_n\text{—}OCH_2CH\text{—}O\text{—}P_2\text{—}(O\text{—}\bigcirc\text{—}C_9H_{19})$ with $CH_3$, $O\text{—}\bigcirc\text{—}C_9H_{19}$, $CH_3$ | 4776 | 25 |
| 6 | $C_{18}H_{37}O\text{—}P\begin{smallmatrix}OCH_2\\OCH_2\end{smallmatrix}C\begin{smallmatrix}CH_2O\\CH_2O\end{smallmatrix}P\text{—}OC_{18}H_{37}$ | 3744 | 15 |
| 7 | di(dodecyloxy)hydrogen phosphate | 4656 | 26 |
| 8 | Tris(dodecylthio)phosphite | 3720 | 112 |
| 9 | Tetrakis(dodecylthio)-1,6-dithiohexylene diphosphite | 8536 | 414 |

The data shows the far superior oxidative stability (150°C. oxygen absorption) of compositions containing the stabilizer combination of this invention (samples 8 and 9 versus samples 1 to 7). Sample 9, containing the polyalkylthiopolyphosphite compound, has oxidative and thermal stability far superior to any known phenolic/phosphorous-containing compound combination. The stabilization achieved is totally unique and unexpected.

I claim:

1. As a stabilizer for organic materials subject to oxidative and/or thermal degradation, a combination consisting essentially of (1) a hydroxyphenylalkyleneyl isocyanurate of the formula

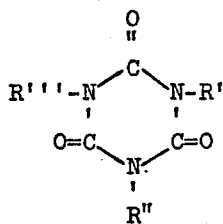

wherein R' is hydroxyphenylalkyleneyl radical of the formula

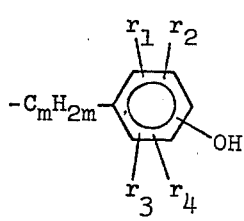

where $m$ is 1 to 4, $r_1$ is an alkyl radical having 1 to 18 carbon atoms and is positioned immediately adjacent to the hydroxyl group on the ring; $r_2$, $r_3$, and $r_4$ are hydrogen or an alkyl radical containing 1 to 18 carbon atoms; and R'' and R''' are hydrogen, an alkyl radical containing 1 to 18 carbon atoms, or are the same as R', and (2) a polyalkylthiopolyphosphite of the formula

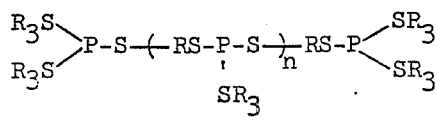

wherein $n = 0$ to 9; R is selected from the group consisting of an alkylene radical of 1 to about 20 carbon atoms, an alkoxyalkyl or alkylthioalkyl radical containing 2 to about 20 carbon atoms, a cycloalkylene radical of 5 to 6 carbon atoms in the ring, and an arylene radical of 6 to 10 carbon atoms; $R_3$ is an alkyl radical of 1 to about 20 carbon atoms; said hydroxyphenylalkyleneyl isocyanurate compound used in a weight ratio of about 10:1 to 1:10 to the thiophosphite compound.

2. A combination of claim 1 where in (1) R'' and R''' are equal to R', $r_1$ is a tertiary alkyl radical containing 4 to about 12 carbon atoms, $r_2$ is an alkyl radical containing 1 to about 12 carbon atoms, $r_3$ and $r_4$ are hydrogen, and $m = 1$.

3. A combination of claim 2 where (1) has the formula

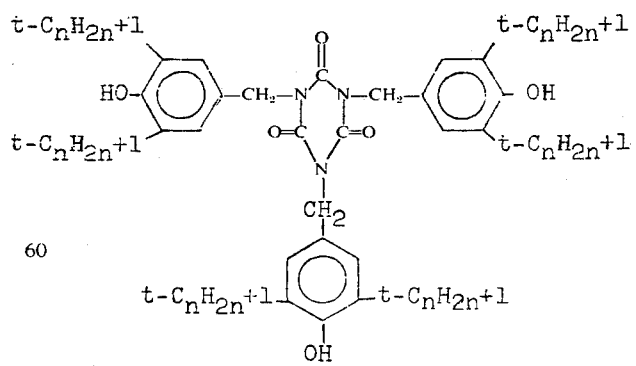

where $n$ is 4 to 8.

4. A combination of claim 3 where in (2), $n = 0$, and R is an alkylene radical of 1 to about 10 carbon atoms or an alkoxyalkyl radical containing 2 to about 10 carbon atoms.

5. A combination of claim 4 consisting of 1,3,5-tris(3,5-di-t-butyl-4-hydroxybenzyl)isocyanurate and tetrakis(dodecylthio)-1,6-dithiohexylene diphosphite.

6. A composition comprising (A) an organic material subject to oxidative and/or thermal degradation, and (B) as the only stabilizer, a combination of (1) a hydroxyphenylalkyleneyl isocyanurate of the formula

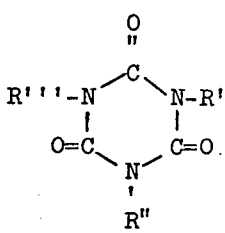

wherein R' is a hydroxyphenylalkyleneyl radical of the formula

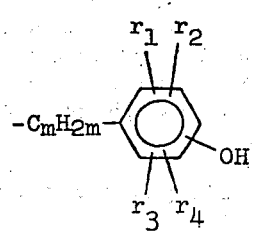

where $m$ is 1 to 4, $r_1$ is an alkyl radical having 1 to 18 carbon atoms and is positioned immediately adjacent to the hydroxyl group on the ring; $r_2$, $r_3$, and $r_4$ are hydrogen or an alkyl radical containing 1 to 18 carbon atoms; and R'' and R''' are hydrogen, an alkyl radical containing 1 to 18 carbon atoms, or are the same as R', and (2) a polyalkylthiopolyphosphite of the formula

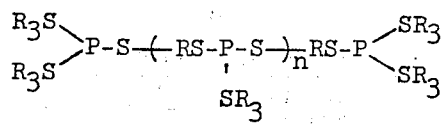

wherein $n = 0$ to 9; R is selected from the group consisting of an alkylene radical of 1 to about 20 carbon atoms, an alkoxyalkyl or alkylthioalkyl radical containing 2 to about 20 carbon atoms, a cycloalkylene radical of 5 to 6 carbon atoms in the ring, and an arylene radical of 6 to 10 carbon atoms; $R_3$ is an alkyl radical of 1 to about 20 carbon atoms; said hydroxyphenylalkyleneyl isocyanurate compound used at a level of from about 0.01 part to about 5 parts by weight per 100 parts by weight of organic material, said thiophosphite compound used at a level of from about 0.01 part to about 5 parts by weight per 100 parts by weight of organic material, and said hydroxyphenylalkyleneyl isocyanurate compound used in about a 10:1 to 1:10 weight ratio to the thiophosphite compound.

7. A composition of claim 6 wherein (A) is a polyα-monoolefin polymer, and in (B) (1), R'' and R''' are the same as R', $r_1$ is a tertiary alkyl radical containing 4 to about 12 carbon atoms, $r_2$ is an alkyl radical containing 1 to about 12 carbon atoms, $r_3$ and $r_4$ are hydrogen, and $m = 1$.

8. A composition of claim 7 wherein (A) is a polyα-monoolefin homopolymer and in (B) (2), $n = 0$, and R is an alkylene radical of 1 to about 10 carbon atoms or an alkoxyalkyl radical containing 2 to about 10 carbon atoms.

9. A composition of claim 8 wherein (A) is polypropylene.

10. A composition of claim 9 wherein B consists of 1,3,5-tris(3,5-di-t-butyl-4-hydroxybenzyl)isocyanurate and tetrakis(dodecylthio)-1,6-dithiohexylene diphosphite.

* * * * *